Patented Oct. 27, 1931

1,829,452

UNITED STATES PATENT OFFICE

MAX OBERLIN, OF DARMSTADT, GERMANY

PROCESS FOR THE PRODUCTION OF 1-(M-AMIDOPHENYL-) 1-HYDROXY-2-METHYLAMIDO-PROPANE

No Drawing. Application filed April 26, 1930, Serial No. 447,777, and in Germany May 14, 1929.

It is very well known that 1-phenyl-, 1-keto-2-methylamido-propane is very easily influenced by oxidizing agents. Therefore it could not be foreseen that cold diluted as well as concentrated nitric acid of a specific gravity of 1,4 would not have any influence on the above mentioned substance; furthermore it is surprising that very strong nitric acid or mixtures of sulfuric and nitric acid do not destroy the substance, but result, when applied to the mentioned starting material, in the formation of the mono-nitro derivative of same.

The obtained nitro derivative yields meta-nitro-benzoic acid when oxidized; therefrom results that the product obtained is 1-(m-nitrophenyl-),1-keto-2-methylamido-propane; this is also proved by the analysis; this product being reduced by any of the well known methods of reduction, e. g. molecular hydrogen in presence of catalysts, results in the production of the 1-(m-amidophenyl-),1-hydroxy-2-methylamido-propane. This latter is important inasmuch as it shows the same properties favourable against defects of respiration as the 1-phenyl-,1-hydroxy-2-methylamido-propane, but is less poisonous for about 50%.

Examples 50 parts of the nitrate of 1-phenyl-,1-keto-2-methylamido-propane are added step by step to 65 parts of cooled fuming nitric acid of a specific gravity of 1,5, whereby care should be taken that the temperature does not exceed 10° C.; this may be effected by cooling. After solution has taken place the mixture is poured on ice, whereby the nitrate crystallizes out; the watery solution of the nitrate is alkalized and the precipitated base taken up with ether and gaseous hydrochloric acid is introduced into the dried etheric solution. By recrystallization from a mixture of alcohol and ether the hydrochloride of 1-(m-nitrophenyl-), 1-keto-2-methylamido-propane is obtained in the form of white needles. The nitrate of this base crystallizes out from alcohol in form of white prismatic needles, which melt at 160–161° under decomposition.

10 parts of the so obtained hydrochloride or nitrate dissolved in 100 parts water are shed in presence of a platin-catalyst in an atmosphere of hydrogen. During about 20 hours an amount of hydrogen is taken up which corresponds to 4 molecules. After sucking off the catalyst the 1-(m-amidophenyl-),1-hydroxy-2-methylamido-propane is precipitated by strongly alkalizing the mixture; the free base is taken up with chloroform or ether; when the chloroform or ether is distilled off from these solutions, the free base begins to crystallize in a good yield. After cooling the base is sucked off and crystallized from a mixture of chloroform and petroleum ether. The 1-(m-amidophenyl-) 1-hydroxy-2-methylamido-propane thus received forms white crystals, melting at 107–108,5°.

By dissolving the above-mentioned base in water or alcohol and neutralizing the solution by one or two molecules of hydrochloric acid, evaporating the solutions and crystallizing the residue from a mixture of alcohol and ether, the mono- or di-hydrochloric salts are received in the form of white crystalline powders. The first melts at 214–215°, the second one at 239–240° (under decomposition).

Claims:

1. A process for the production of 1-(m-amidophenyl-),1-hydroxy-2-methylamido-propane which consists in the treatment of a salt of 1-phenyl-,1-keto-2-methylamido-propane with nitric acid of a specific gravity of more than 1,4 separating the so formed nitrate of the nitro derivative by crystallization; isolating the so formed nitric salt of the nitro derivative and reducing it in a suitable way, finally precipitating the 1-(m-amidophenyl-),1-hydroxy-2-methylamido-propane by alkalizing the solution.

2. As a new and useful product 1-(m-amidophenyl-) 1-hydroxy-2-methylamido-propane

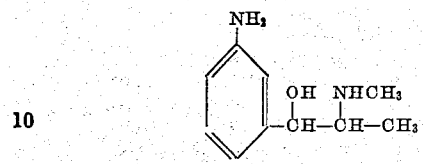

forming white crystalline plates showing a melting point of 107–108,5°, being easily soluble in alcohol, soluble in chloroform and water, more difficultly soluble in ether, insoluble in petrol-ether; the mono-hydrochloric salt of the new compound consisting of fine white needles of a melting point of 214–215°, being very easily soluble in water, more difficultly soluble in alcohol and insoluble in ether; the di-hydrochloric salt of the new compound consisting of white needles of a melting point of 239–240° under decomposition, being very easily soluble in water, more difficultly soluble in alcohol and insoluble in ether.

In testimony whereof I have hereunto signed my name at Frankfort-on-the-Main this twelfth day of April, 1930.

MAX OBERLIN.